(12) United States Patent
Bachmann

(10) Patent No.: US 8,061,765 B2
(45) Date of Patent: Nov. 22, 2011

(54) VEHICLE BODY

(75) Inventor: Mike Bachmann, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 229 days.

(21) Appl. No.: 12/467,329

(22) Filed: May 18, 2009

(65) Prior Publication Data

US 2010/0032990 A1   Feb. 11, 2010

(30) Foreign Application Priority Data

Aug. 7, 2008   (DE) .......................... 10 2008 036 870

(51) Int. Cl.
*B60K 37/00*   (2006.01)
(52) U.S. Cl. ........................................................ 296/205
(58) Field of Classification Search .................. 296/205, 296/190.08, 193.02, 204, 208, 187.08, 193.07
See application file for complete search history.

(56) References Cited

U.S. PATENT DOCUMENTS

| | | | | |
|---|---|---|---|---|
| 2,627,437 A * | 2/1953 | Toncray et al. | .......... | 296/203.01 |
| 2,908,528 A * | 10/1959 | Richter | ...................... | 296/181.4 |
| 3,034,823 A * | 5/1962 | Hinka et al. | .................. | 296/204 |
| 3,073,647 A * | 1/1963 | Beltz | ............................. | 296/204 |
| 4,081,197 A * | 3/1978 | Ackel | ........................... | 296/204 |
| 4,457,555 A * | 7/1984 | Draper | ......................... | 296/181.4 |
| 4,514,891 A * | 5/1985 | Draper | ......................... | 29/401.1 |
| 4,570,321 A * | 2/1986 | Draper | ......................... | 29/401.1 |
| 4,662,052 A * | 5/1987 | Draper | ......................... | 29/401.1 |
| 4,840,424 A * | 6/1989 | Asoh | ............................. | 296/204 |
| 4,842,193 A * | 6/1989 | Eger et al. | ................. | 237/12.3 A |
| 5,000,509 A * | 3/1991 | Sinnhuber et al. | ........ | 296/187.12 |
| 5,129,700 A * | 7/1992 | Trevisan et al. | ......... | 296/193.07 |
| 5,562,329 A * | 10/1996 | Srock et al. | ............. | 296/203.01 |
| 5,772,267 A * | 6/1998 | Heim et al. | .................... | 293/133 |
| 5,897,155 A * | 4/1999 | Kerner et al. | ................. | 296/37.8 |
| 6,015,022 A * | 1/2000 | Thuliez | ......................... | 180/210 |
| 6,102,472 A * | 8/2000 | Wallstrom | ............... | 296/203.01 |
| 6,270,153 B1 * | 8/2001 | Toyao et al. | .................. | 296/204 |
| 6,296,300 B1 * | 10/2001 | Sato | ......................... | 296/187.08 |
| 6,460,918 B1 * | 10/2002 | Sato et al. | ...................... | 296/204 |
| 6,540,286 B2 * | 4/2003 | Takemoto et al. | ............ | 296/204 |
| 6,595,581 B2 * | 7/2003 | Wolkersdorfer et al. | ..... | 296/204 |
| 6,688,676 B1 * | 2/2004 | Sato | ......................... | 296/187.05 |
| 6,908,145 B2 * | 6/2005 | Joaquin et al. | ........... | 296/193.07 |
| 6,981,736 B2 * | 1/2006 | Morsch et al. | ........... | 296/193.07 |
| 7,422,271 B2 * | 9/2008 | Wolkersdorfer et al. | | 296/193.02 |
| 7,600,807 B2 * | 10/2009 | Bachmann | ............... | 296/187.08 |
| 7,669,917 B2 * | 3/2010 | Schiebel et al. | ......... | 296/187.01 |

(Continued)

FOREIGN PATENT DOCUMENTS

CN          1919634 A        2/2007

(Continued)

OTHER PUBLICATIONS

German Search Report dated May 7, 2009.

*Primary Examiner* — Kiran B. Patel

(57) ABSTRACT

A vehicle body has a central tunnel with an open tunnel region which contains profiled closing parts which are disposed spaced apart from one another in the vehicle longitudinal direction and which are arranged and fastened between longitudinally running turned-out portions of the central tunnel. The central tunnel is fastened to a vehicle base.

11 Claims, 4 Drawing Sheets

U.S. PATENT DOCUMENTS

| | | | |
|---|---|---|---|
| 2006/0049668 A1* | 3/2006 | Eipper et al. | 296/193.04 |
| 2006/0103169 A1* | 5/2006 | Anders | 296/193.01 |
| 2006/0108834 A1* | 5/2006 | Boulay et al. | 296/193.04 |
| 2006/0284044 A1* | 12/2006 | Lawall et al. | 248/424 |
| 2008/0007089 A1 | 1/2008 | Bachmann | |
| 2008/0309113 A1* | 12/2008 | Baudart | 296/70 |
| 2010/0237659 A1* | 9/2010 | Ishigame et al. | 296/204 |
| 2011/0001337 A1* | 1/2011 | Patschicke et al. | 296/193.07 |

FOREIGN PATENT DOCUMENTS

| | | |
|---|---|---|
| CN | 101100199 A | 1/2008 |
| DE | 4335043 A1 | 4/1995 |
| DE | 29808607 U1 | 9/1998 |
| DE | 102 35 532 A1 | 2/2004 |
| DE | 10335541 A1 | 3/2005 |
| DE | 102006015872 A1 | 10/2007 |
| DE | 102006031452 A1 | 1/2008 |

* cited by examiner

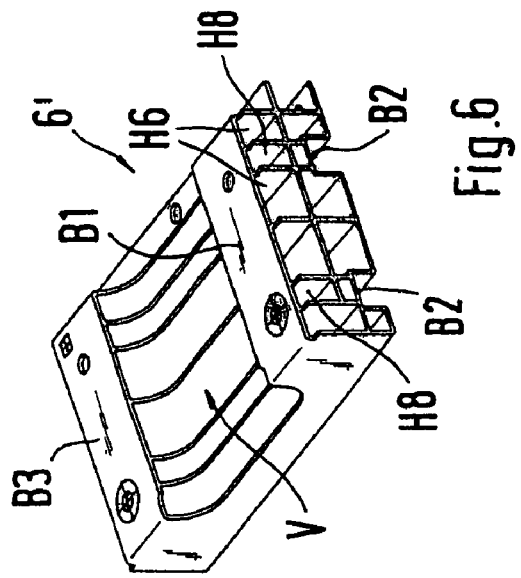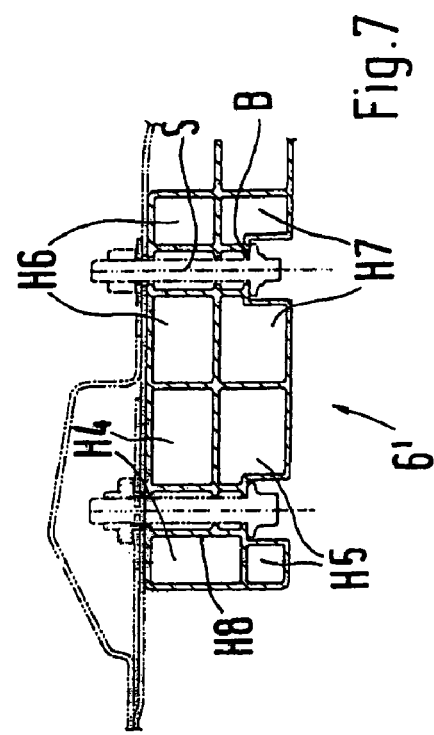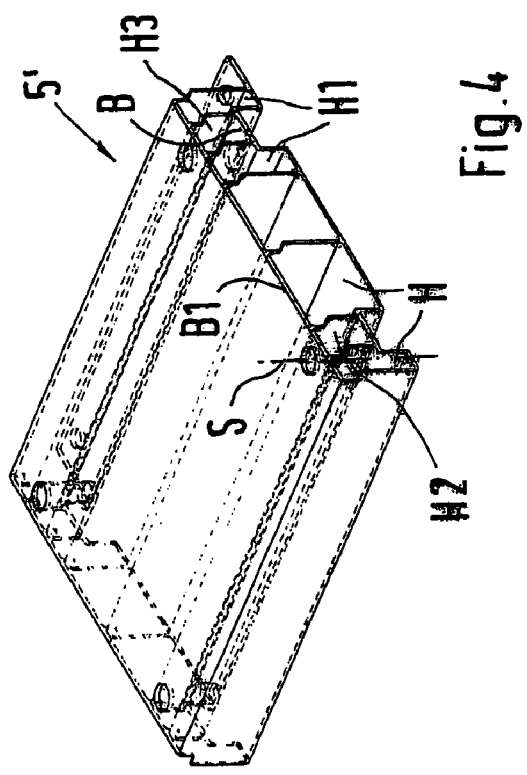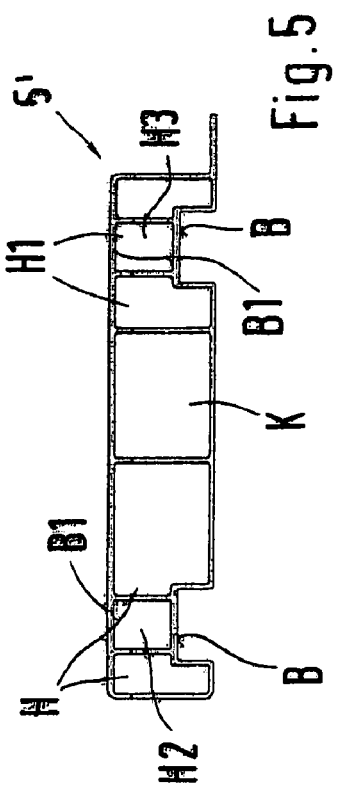

VEHICLE BODY

CROSS-REFERENCE TO RELATED APPLICATION

This application claims the priority, under 35 U.S.C. §119, of German application DE 10 2008 036 870.9, filed Aug. 7, 2008; the prior application is herewith incorporated by reference in its entirety.

BACKGROUND OF THE INVENTION

Field of the Invention

The invention relates to a vehicle body having an upright central tunnel which extends in the vehicle longitudinal direction and which is connected to a vehicle base. The central tunnel is in the shape of a U-profile in cross section and a lower open tunnel region is directed toward the vehicle base.

Published, non-prosecuted German patent application DE 102 35 532 A1 discloses a transverse bridge for a central tunnel of a base structure of a motor vehicle body, with the transverse bridge serving to stiffen a downwardly open tunnel region of the central tunnel.

SUMMARY OF THE INVENTION

It is accordingly an object of the invention to provide a vehicle body that overcomes the above-mentioned disadvantages of the prior art devices of this general type.

With the foregoing and other objects in view there is provided, in accordance with the invention, a vehicle body. The vehicle body contains a vehicle base; and an upright central tunnel extending in a vehicle longitudinal direction and connected to the vehicle base. The upright central tunnel has longitudinally running turned-out portions, a shape of a U-profile in cross section, and a lower open tunnel region directed toward the vehicle base. The upright central tunnel further has, at the lower open tunnel region, profiled closing parts disposed spaced apart from one another in the vehicle longitudinal direction and disposed and fastened between the longitudinally running turned-out portions.

It is an object of the invention to provide closing parts on an underside of a central tunnel of a vehicle, which closing parts can be mounted in a simple manner from the underside of a vehicle base and which closing parts, overall, serve to stiffen the base structure of a vehicle body.

The primary advantages obtained by the invention are that the closing parts contribute to the stiffness of the base structure of the vehicle body, and forces can be transmitted in particular in the event of a side impact. This is achieved according to the invention in that the central tunnel contains, at its open tunnel region, profiled closing parts which are arranged spaced apart from one another in the vehicle longitudinal direction and which are arranged and fastened for example between longitudinally running angled turned-out portions of the central tunnel.

In a further refinement of the invention, it is provided that the closing parts are arranged in each case between a front and a rear transverse seat support for vehicle seats, which transverse seat supports extend in each case to both sides of the central tunnel and are fixedly connected to the vehicle base. By such an arrangement and configuration of the closing parts between the transverse seat supports of each side in the open tunnel region, it is achieved that, in the event of side impact forces, the closing parts can introduce impact forces from one side via the tunnel region into the other side of the base structure.

The two closing parts of the central tunnel are preferably composed, according to one refinement, of extruded profiles or, according to a further embodiment, one closing part may be composed of a ribbed cast part composed of an aluminum material, and a further closing part may be composed of an extruded profile. A rigid force-transmitting and moment-transmitting component is provided by the configuration of the closing parts.

Furthermore, according to the invention, the closing part which is formed as an extruded profile may contain a plurality of hollow chambers which are divided by vertical webs and which run in the vehicle transverse direction. The construction of extruded profiles with a plurality of hollow chambers first results in a lightweight component, and second, relatively large forces occurring in the vehicle transverse direction can be absorbed and transmitted.

According to one preferred embodiment of the invention, it is provided that the rear closing part has in each case one enclosed hollow chamber in outer transversely running hollow chambers of an extruded profile. The hollow chamber has an inwardly offset lower base, with a fastening screw for the two-shear connection to the central tunnel being arranged in the hollow chamber through an upper base of the extruded profile and the lower base of the enclosed hollow chamber, which fastening screw extends through the two bases. In particular, the extruded profile has, for the targeted absorption of crash forces, an outer hollow chamber which has a greater width than the further outer hollow chamber, and a central hollow chamber is arranged between the hollow chambers.

The closing part which, as a further embodiment variant of the invention, is formed as a ribbed cast part has a plurality of transversely running vertical webs which are spaced apart from one another and which are connected by a plurality of vertical transverse webs, with the webs forming, overall, a support structure which is open to one side. By the rib arrangements over the longitudinal and transverse webs, a stable closing part which absorbs moments of force is created.

In one refinement of the invention it is provided that the front closing part which is formed as a ribbed cast part has, proceeding from a fastening surface on the turned-out portion of the central tunnel, an elevated support bridge which is supported with an end-side support surface bearing in each case against an inner wall of the central tunnel. By the support bridge between the side walls of the central tunnel, additional stability in the event of side forces is obtained, in addition to the fastening to the central tunnel, by means of the elevated end-side support surface at the end side of the support bridge. The extruded profile part and the cast part of the closing parts are fastened at the corners by fastening screws to the vehicle body, for example in welded nuts.

According to one preferred embodiment of the invention, it is provided that the front closing part is composed of an extruded profile which, at least in the region of upper transversely running fastening webs, has a plurality of transversely running hollow chambers which are arranged one above the other and adjacent to one another. In each case one further hollow chamber is enclosed in outer hollow chambers for the leadthrough of fastening screws, which further hollow chamber has an inwardly offset lower base and an upper base for the two-shear connection to the central tunnel by the fastening screws. The closing part has formed in it, between the fastening webs, a depression as a clearance for water lines of the vehicle. The depression may for example be produced by milling.

Other features which are considered as characteristic for the invention are set forth in the appended claims.

Although the invention is illustrated and described herein as embodied in a vehicle body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is a diagrammatic, perspective view of a second embodiment variant of the rear closing part as an extruded profile for the two-shear connection to the central tunnel;

FIG. 5 is a diagrammatic, elevational view of an end side of the rear closing part as per FIG. 4;

FIG. 6 is a diagrammatic, perspective view of a second embodiment variant of the front closing part as an extruded profile with a plurality of hollow chambers, and a two-shear connection of the closing part to the central tunnel and to the vehicle body; and FIG. 7 is a diagrammatic, sectional view of the closing part as per FIG. 6 with a two-shear connection to the central tunnel by fastening screws.

DETAILED DESCRIPTION OF THE INVENTION

Figure 1:
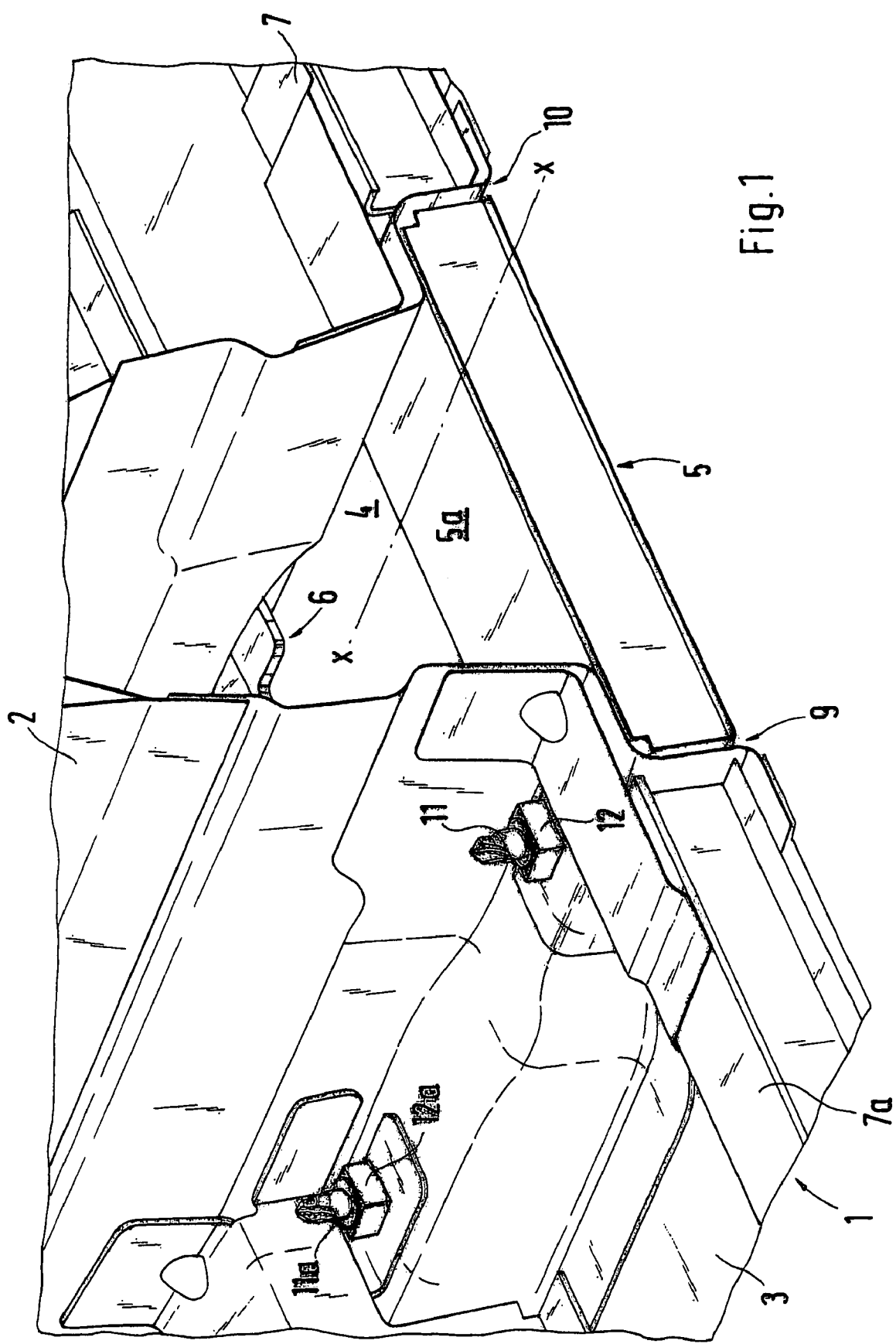
FIG. 1 is a diagrammatic, perspective view of a central tunnel which is connected into a base structure of a vehicle body and which has closing parts, which are arranged in the open tunnel region, between transverse seat supports, of a first embodiment variant according to the invention.

Referring now to the figures of the drawing in detail and first, particularly, to FIG. 1 thereof, there is shown a base structure 1 of a vehicle body, a central tunnel 2 is connected to a vehicle base 3. The central tunnel 2 is substantially in the shape of a U-profile in cross section and has an open tunnel region 4 which is directed toward the vehicle base 3, which tunnel region 4 is bridged by two closing parts 5; 5' and 6; 6' which are spaced apart from one another in the vehicle longitudinal direction L1. The closing parts 5; 5' and 6; 6' are provided in each case between two transverse seat supports 7, 7a and 8, 8a which are arranged so as to be situated opposite one another on each side of the central tunnel 2.

Figure 2:
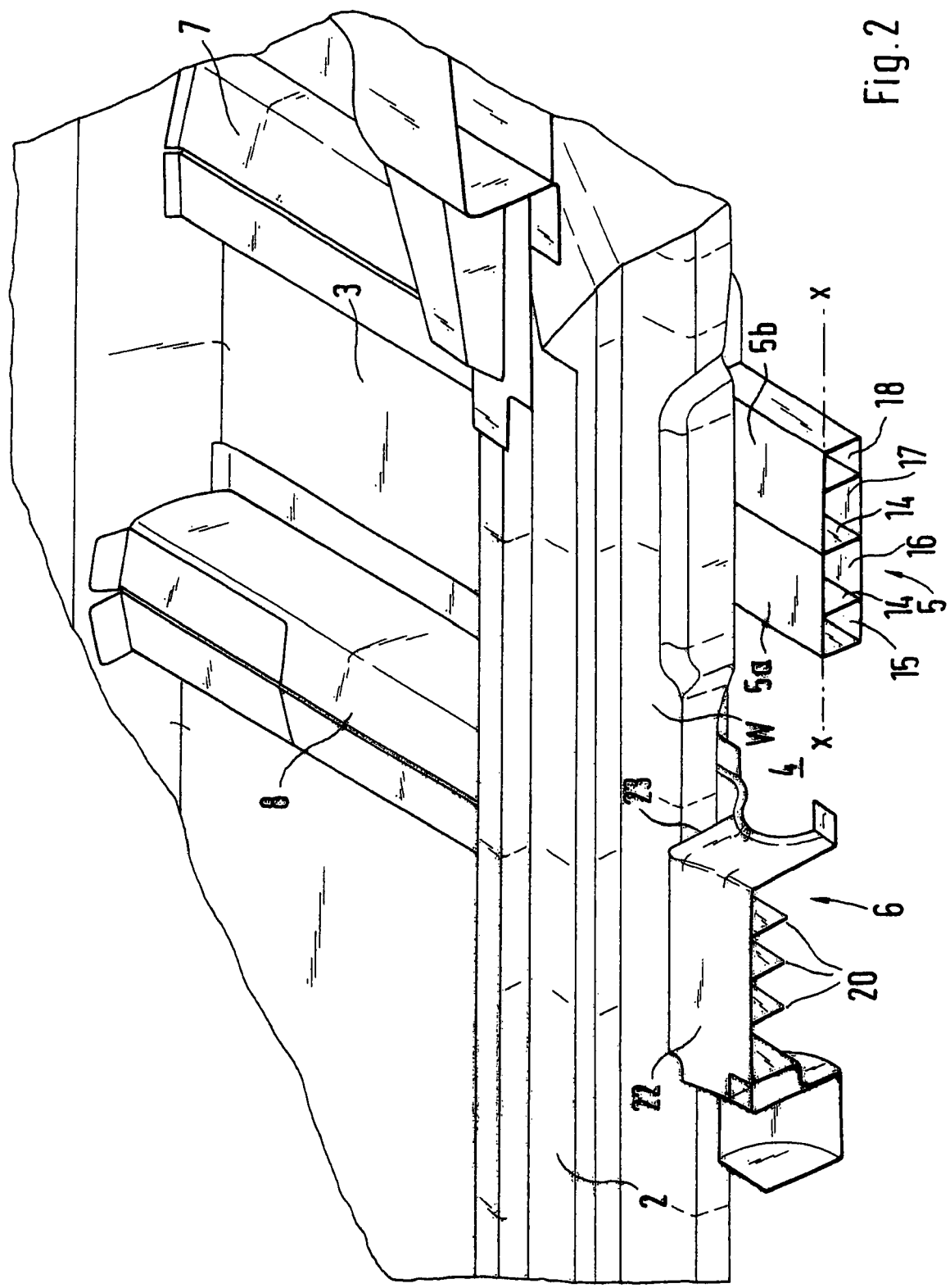
FIG. 2 is a diagrammatic, perspective view into the interior of the central tunnel with the closing part sectioned in the plane II-II shown in FIG. 1.
Figure 3:
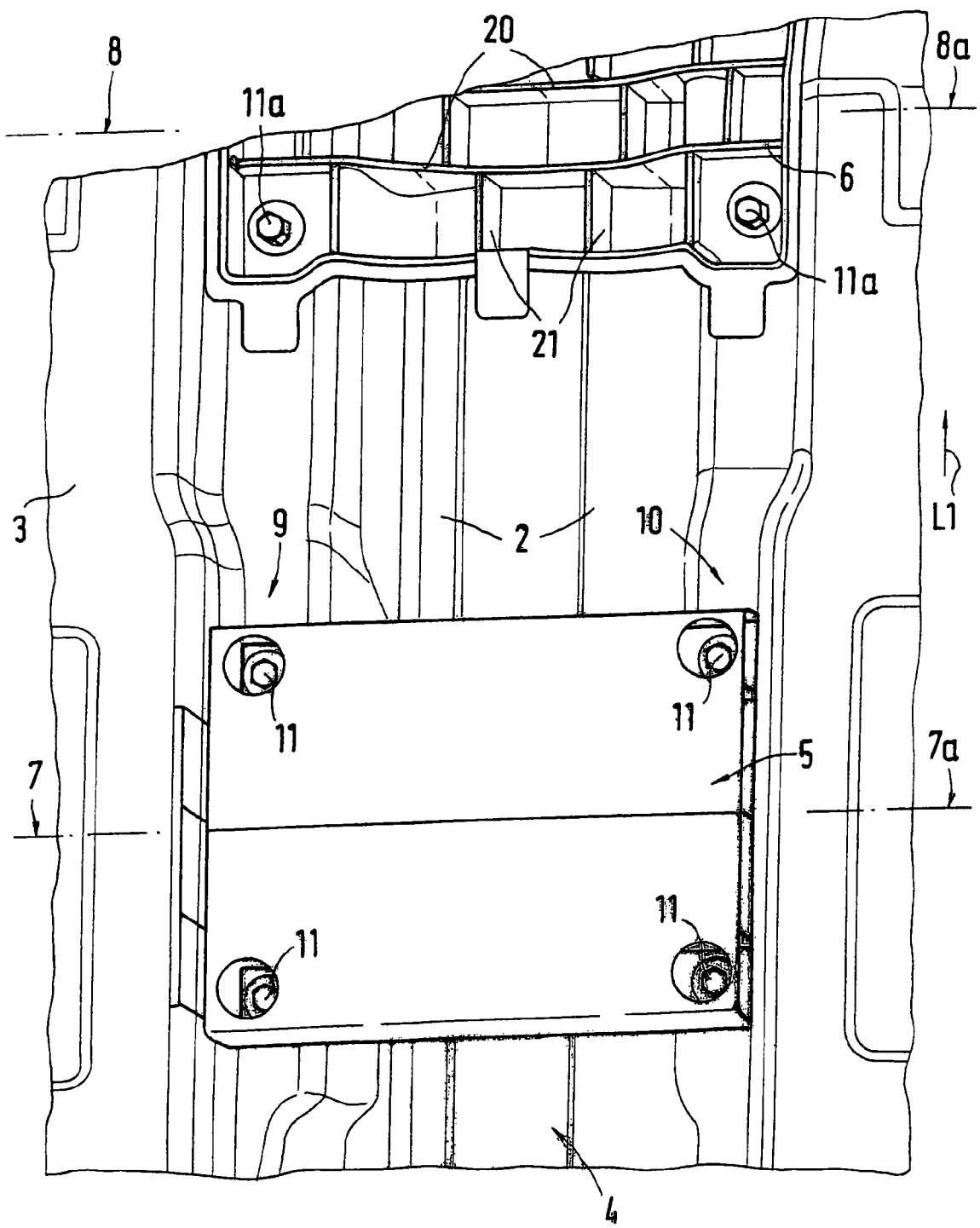
FIG. 3 is a diagrammatic, perspective view of the two closing parts from below, with the rear closing part being formed as an extruded profile with hollow chambers, and with the front closing part being formed as a ribbed cast part according to the first embodiment variant as per FIG. 1.

The two closing parts 5 and 6 are composed, in an embodiment variant according to FIGS. 4 to 7, of extruded profiles. According to a further embodiment variant according to FIGS. 1 to 3, the one front closing part 6 may be formed as an extruded profile and the further, rear closing part 5 may be formed as a cast part.

As illustrated in more detail in FIG. 1, the closing part 5 is held between two angled turned-out portions 9, 10 of the central tunnel 2 and is connected thereto by fastening screws 11 which are held in welded nuts 12 of the vehicle body.

The extruded profile of the closing part 5 has a plurality of vertical webs 14 which form between them open hollow chambers 15 to 18. The closing part 5 may also be composed of two extruded profiles 5a and 5b which are placed one against the other, as shown in more detail in FIG. 2. In the illustration, the closing part 5 is illustrated in section in the plane II-II as per FIG. 1.

According to a further embodiment variant according to FIGS. 4 and 5, it is provided that the rear closing part 5 has in each case one enclosed hollow chamber H2 and H3 in outer transversely running open hollow chambers H, H1 of an extruded profile. The hollow chamber has an inwardly offset lower base B, and a fastening screw S for the two-shear connection to the central tunnel 2 and to the vehicle body is arranged in the hollow chamber H2, H3, which fastening screw S extends through an upper base B1 and the lower base B of the enclosed hollow chamber H2, H3. The one outer hollow chamber H has a greater width than the further outer hollow chamber H1, and a further, central hollow chamber K is arranged between the two hollow chambers H and H1.

The ribbed cast part of the front closing part 6 (FIG. 3) has a plurality of transversely running vertical webs 20 which are spaced apart from one another and which are connected by a plurality of transverse webs 21, and the webs 20, 21 form, overall, a downwardly open support structure. The ribbed cast part of the closing part 6 has, between the side walls W of the central tunnel 2, an elevated support bridge 22 which is supported with an end surface 23 bearing in each case against the inner wall W of the central tunnel 2.

According to a further embodiment variant (FIGS. 6 to 7), it is provided that the front closing part 6', like the rear closing part 5', is composed of an extruded profile which, at least in the region of upper fastening webs B1 and B3, has a plurality of open hollow chambers H4, H5 and H6, H7 which are arranged one above the other and adjacent to one another, with in each case one further hollow chamber H8 being enclosed in outer hollow chambers H4, H5 and H6, H7 for the leadthrough of fastening screws S, which further hollow chamber H8 has an inwardly offset base B2 for the two-shear connection to the central tunnel 2 or to the vehicle body by fastening screws S through the fastening web B1 and B3 and through the base B2. The closing part 6 has formed in it, between the upper fastening webs B1 and B3 of the extruded profile, a depression V as a clearance for water lines of the vehicle, which depression V is formed in by mechanical machining.

A wall thickness distribution for a defined deformation in the event of a crash is obtained by the formation of the two closing parts 5' and 6' (FIGS. 4 to 7) as extruded profiles in the described embodiment variant. The two-shear connection of the closing parts 5' and 6' to the central tunnel by the fastening screws has the advantage that a breakaway of the fastening screws S in the event of a crash is substantially prevented by an optimum load and contact pressure distribution. Also, the closing parts 5' and 6', by the formation of chambers, provide optimum stiffness properties in the event of occurring vehicle torsion. The closing parts 5' and 6' can be mounted and dismounted in a simple manner from the underside of the vehicle. For crash absorption, the closing parts are in precise alignment with the transverse seat supports or other base members in the vehicle body.

The invention claimed is:

1. A vehicle body, comprising:
a vehicle base;

an upright central tunnel extending in a vehicle longitudinal direction and connected to said vehicle base, said upright central tunnel having longitudinally running turned-out portions, a shape of a U-profile in cross section, and a lower open tunnel region directed toward said vehicle base, said upright central tunnel further having, at said lower open tunnel region, two profiled closing parts disposed spaced apart from one another in the vehicle longitudinal direction and disposed and fastened between said longitudinally running turned-out portions and extending across a width of said upright central tunnel;

front and rear transverse seat supports for vehicle seats, said two profiled closing parts disposed in each case between said front and rear transverse seat supports, said front and rear transverse seat supports extending in each case to both sides of said upright central tunnel and connected to said vehicle base;

said two profiled closing parts being composed of extruded profiles and including a front closing part and a rear closing part, one of said two profiled closing parts having transversely running fastening webs being upper fastening webs, in a region of said transversely running fastening webs said profiled closing part has a plurality of transversely running open hollow chambers disposed one above another and adjacent to one another, said hollow chambers include outer hollow chambers and in each case one further hollow chamber being enclosed in said outer hollow chambers for providing a leadthrough for fastening screws, said further hollow chamber having an inwardly offset base and said upper fastening webs for one of a two-shear connection to said upright central tunnel or a connection to components of said vehicle body by means of said fastening screws.

2. The vehicle body according to claim 1, wherein said one profiled closing part has formed in it, between said upper transversely running fastening webs, a depression functioning as a clearance for water lines of the vehicle body.

3. The vehicle body according to claim 1, wherein a first of said profiled closing parts is composed of an extruded profile and a second of said profiled closing parts is composed of a ribbed cast part.

4. The vehicle body according to claim 3, wherein said first profiled closing part formed as said extruded profile contains a plurality of hollow chambers divided by vertical webs and run in a vehicle transverse direction.

5. The vehicle body according to claim 3,
wherein said first profiled closing part has a plurality of hollow chambers including outer transversely running hollow chambers and one enclosed hollow chamber disposed in each of said outer transversely running hollow chambers, said enclosed hollow chamber having an inwardly offset lower base and an upper base; and
further comprising a fastening screw for a two-shear connection to said upright central tunnel and disposed in said upper base of said enclosed hollow chamber and in said inwardly offset lower base of said enclosed hollow chamber.

6. The vehicle body according to claim 5, wherein:
a first of said outer transversely running hollow chambers has a greater width than a second of said outer transversely running hollow chambers; and
said first profiled closing part formed as said extruded profile contains a further, central hollow chamber disposed between said first and second outer transversely running hollow chambers.

7. The vehicle body according to claim 3, wherein said second profiled closing part formed as said ribbed cast part contains a plurality of transverse webs and a plurality of transversely running vertical webs which are spaced apart from one another and are connected to each other by means of said plurality of transverse webs, said transverse webs and said transversely running vertical webs form a support structure which is open to one side.

8. The vehicle body as claimed in claims 3, wherein:
said upright central tunnel has an inner wall; and
said second profiled closing part formed as said ribbed cast part has, proceeding from a fastening surface on said turned-out portion of said upright central tunnel, an elevated support bridge supported with a support surface bearing in each case against said inner wall of said upright central tunnel.

9. The vehicle body according to claim 3, wherein said first profiled closing part formed as said extruded profile contains a web wall and two extruded profile parts which are disposed adjacent to one another and which have in each case two transversely running hollow chambers which are separated by said web wall.

10. The vehicle body according to claim 3,
further comprising fastening screws and one of welded nuts and retaining nuts; and
wherein said extruded profile and said rib cast part of said profiled closing parts are fastened at corners by means of said fastening screws to said vehicle body via one of said welded nuts and said retaining nuts.

11. The vehicle body according to claim 1, further comprising fastening screws, said profiled closing parts can be mounted on one of said upright central tunnel and on parts of said vehicle body from an underside of a vehicle by means of said fastening screws.

* * * * *